(12) United States Patent
Bak et al.

(10) Patent No.: US 8,941,656 B2
(45) Date of Patent: *Jan. 27, 2015

(54) SPATIOTEMPORAL VISUALIZATION OF SENSOR DATA

(71) Applicant: International Business Machines Corporation, Armonk, NY (US)

(72) Inventors: Peter Bak, Haifa (IL); Irina Dumitrescu, Carlton (AU); Juerg von Kaenel, Carlton (AU); Gilad M. Saadoun, Haifa (IL); Xing Zhi Sun, Carlton (AU)

(73) Assignee: International Business Machines Corporation, Armonk, NY (US)

( * ) Notice: Subject to any disclaimer, the term of this patent is extended or adjusted under 35 U.S.C. 154(b) by 105 days.

This patent is subject to a terminal disclaimer.

(21) Appl. No.: 13/730,229

(22) Filed: Dec. 28, 2012

(65) Prior Publication Data

US 2014/0184649 A1 Jul. 3, 2014

Related U.S. Application Data

(63) Continuation of application No. 13/730,018, filed on Dec. 28, 2012.

(51) Int. Cl.
*G06T 11/20* (2006.01)
*G06T 17/00* (2006.01)
(Continued)

(52) U.S. Cl.
CPC ....................................... *G06T 11/20* (2013.01)
USPC ........... 345/428; 345/619; 345/660; 345/661; 345/665; 345/441; 715/764; 715/788; 715/800; 715/801; 701/400; 701/408; 701/409; 701/532; 701/538

(58) Field of Classification Search
CPC .......... G06T 3/40; G06T 11/00; G06T 11/20; G06T 11/40; G06T 11/60; G06T 15/00; G06T 15/04; G06F 3/048; G06F 3/0481
USPC ................. 345/428, 619, 660, 661, 665, 441; 715/764, 788, 800, 801; 701/400, 408; 701/409, 532, 538
See application file for complete search history.

(56) References Cited

U.S. PATENT DOCUMENTS 8,694,241 B1 * 4/2014 Kadous et al. ................ 701/412
2008/0033632 A1 * 2/2008 Lee ............................... 701/117
(Continued)

FOREIGN PATENT DOCUMENTS

EP 1755056 A1 2/2007

OTHER PUBLICATIONS

A. Love, et al., "Visualizing Spatial Multivalue Data," IEEE Computer Graphics and Applications, vol. 25, Issue 3, May/Jun. 2005, pp. 69-79.

(Continued)

*Primary Examiner* — Ke Xiao
*Assistant Examiner* — Jed-Justin Imperial
(74) *Attorney, Agent, or Firm* — Cantor Colburn LLP; Louis Percello

(57) ABSTRACT

A method for visualizing data includes generating on a display device a map including a first location and generating on the display device at least one icon graphically representing measurements of the sensor at the first location over a period of time and graphically representing the period of time.

10 Claims, 10 Drawing Sheets

(51) Int. Cl.
*G06F 3/048* (2013.01)
*G09G 5/00* (2006.01)

(56) References Cited

U.S. PATENT DOCUMENTS

2009/0040228 A1* 2/2009 Lee et al. .................. 345/440
2011/0202888 A1 8/2011 Rusu et al.
2013/0179817 A1 7/2013 Bak et al.

OTHER PUBLICATIONS

Diansheng Guo, "Flow Mapping and Multivariate Visualization of Large Spatial Interaction Data," IEEE Transactions on Visualization and Computer Graphics, vol. 15, No. 6, Nov./Dec. 2009, pp. 1041-1048.

Draper, et al., "A Survey of Radial Methods for Information Visualization," IEEE Transactions on Visualization and Computer Graphics, vol. 15, Issue 5, Feb. 2009, pp. 759-776.

G. Andrienko, et al., "Visual Exploration of the Spatial Distribution of Temporal Behaviors," Proceedings of the Ninth International Conference on Information Visualisation (IV'05), IEEE Computer Society, 2005, pp. 1-8.

P. Bak, et al.,"Spatiotemporal Analysis of Sensor Logs Using Growth Ring Maps," IEEE Transactions on Visualization and Computer Graphics, vol. 15, Issue: 6, Oct. 2009, pp. 1-8.

S. Kisilevich, et al., "Spatio-Temporal Clustering: A Survey," Technical Report—ISTI-CNR, Data Mining and Knowledge Discovery Handbook, Springer, Jul. 2010, pp. 1-22.

T Kapler, et al., "GeoTime Information Visualization," IEEE Info Vis 2004, Oculus Info, pp. 1-8.

* cited by examiner

US 8,941,656 B2

SPATIOTEMPORAL VISUALIZATION OF SENSOR DATA

CROSS-REFERENCE TO RELATED APPLICATION

This application is a continuation of U.S. patent application Ser. No. 13/730,018, filed Dec. 28, 2012, the disclosure of which is incorporated by reference herein in its entirety.

BACKGROUND

The present disclosure relates to the spatiotemporal visualization of sensor data, and in particular to the displaying of a magnitude of sensor data over a period of time at a particular location on a map.

As the world becomes increasingly automated and as more information is generated, effectively analyzing patterns and trends is crucial for taking informed action. Sensors generate a substantial amount of data for automation, monitoring and other purposes. Sensors vary in complexity from simple sensors that output a single value at any given point in time to complex sensors providing signals of varying magnitudes, frequencies or phases. With widespread adoption of location-aware devices, spatial information and spatial dimensions of sensor data are increasingly important.

SUMMARY

Embodiments include an apparatus for visualizing data. The apparatus includes memory for storing sensor data and a processor configured to generate a map, and to display at a first location on the map at least one icon graphically representing a measurement of the sensor at the first location over a period of time and graphically representing the period of time.

Additional embodiments include a computer program product for visualizing data. The computer program product includes a tangible storage medium readable by a processing circuit and storing instructions for execution by the processing circuit for performing a method. The method includes generating a map including a first location and generating at least one icon graphically representing a measurement at the first location and a period of time.

Further embodiments a method for visualizing data. The method includes generating a map including a first location and generating at least one icon graphically representing a measurement of the sensor at the first location over a period of time and graphically representing the period of time.

Further embodiments include a method for visualizing data including gathering a plurality of measurements corresponding to a location of a map over a period of time. The method further includes generating an icon at the location on the map having at least one of a size, a shape and a color corresponding to the plurality of measurements, and having at least one of a size, a shape and a color corresponding to the period of time.

Additional features and advantages are realized through the techniques of the present disclosure. Other embodiments and aspects of the present disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter of the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Sensors may provide data having a particular magnitude and being associated with particular times and locations. Embodiments of the invention relate to displaying spatiotemporal data associated with sensors on a map.

Figure 1:
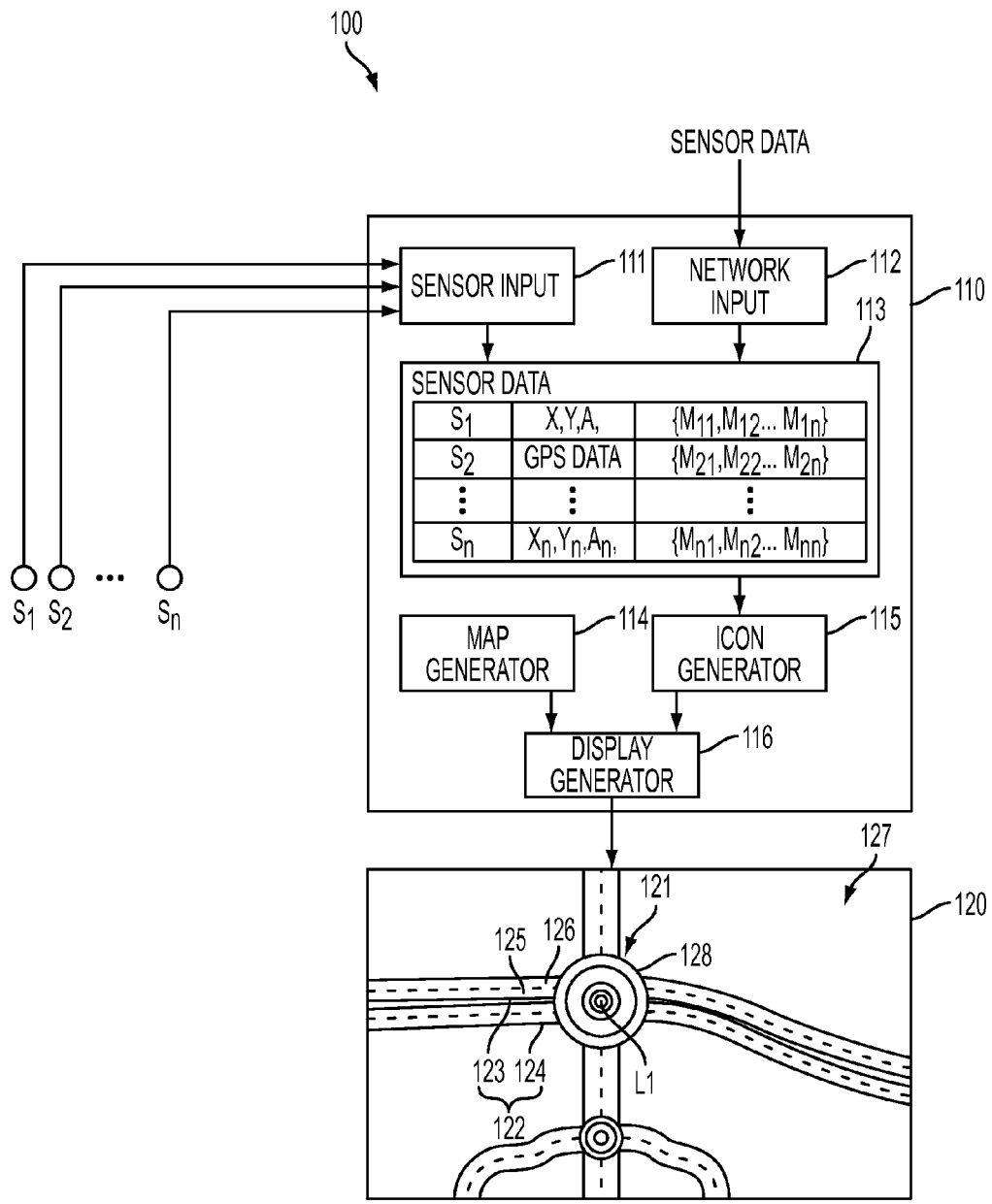
FIG. 1 illustrates a system for generating a spatiotemporal display according to one embodiment of the invention.

FIG. 1 illustrates a system 100 for displaying spatiotemporal sensor data according to one embodiment of the invention. The system 100 includes sensors $S_1$, $S_2$ ... $S_n$ (also referred to as sensors S, for purposes of description), a computer 110 and a display device 120. The sensors S may be any type of sensor capable of generating an electrical signal in response to detecting any characteristic, such as voltage, current, weight, strain, light (or absence of light), magnetism, or any other detectable characteristic. The sensors S may also correspond to data or power monitoring or tracking mechanisms, such as a computer or computerized device that monitors a data level or power level along a data or power line. The sensors S may transmit output signals via wires or wirelessly to a sensor input 111. Alternatively, the sensors S may transmit data to a network, other device or other system, and the sensor data may be transmitted to a network input 112 of the computer 110 from the network, other device or other system.

The sensor data 113 is stored in memory and may be stored as an array or in the form of a table, for example. FIG. 1 illustrates a sensor data table 113 having sensor information stored together with the sensor identification. For example, sensor $S_1$ is located at location X, Y (2-dimensional coordinates), A (height) and has provided measurements of $M_{11}$, $M_{12}$ ... $M_{1n}$. Sensor $S_2$ includes a GPS identifier instead of a fixed location, indicating that the location of the sensor $S_2$ may be obtained from a GPS device. The sensor $S_2$ is associated with measurement data $M_{21}, M_{22} \ldots M_{2n}$. Any number of sensors and any type of data associated with the sensors may be stored.

In one embodiment, sensor data may be organized according to different time periods and different hierarchal levels, where a hierarchal level corresponds to a grouping of sensors. For example, referring to the map 127 of FIG. 1, an intersection 121 of a street may have a highest hierarchal level of "intersection," which may be made up of sub-hierarchal levels of "direction," which may in turn be made up of sub-hierarchal levels of "lane." Each lane 125 and 126 of each direction 123 and 124 of each side 122 of the intersection 121 may have a corresponding sensor. In other words, each lane entering the intersection may have a sensor, so that the intersection of FIG. 1 may have 6 sensors, for example. Sensor data associated with an "intersection" hierarchal level may be displayed at a lesser level of detail than sensor data displayed at a "lane" hierarchal level.

In other words, sensor data displayed at the "lane" level of detail may display the sensor data associated with each of the lanes 125 and 126 as separate visual data elements, resulting in up to six separate visual data elements corresponding to the six lanes of the intersection 121 of FIG. 1. Sensor data displayed at the "direction" level of detail may combine the sensor data of each of the lanes 125 and 126 into a single visual data element, resulting in up to four separate visual data elements corresponding to the four different directions entering the intersection 121. And sensor data displayed at the "intersection" level of detail may combine the sensor data of each of the directions 123 and 124 into a single visual data element, resulting in one visual data element corresponding traffic through the intersection 121 from any direction.

In addition, sensor data may be stored and displayed over any desired period of time. For example, in a first display setting, sensed traffic levels in the intersection over a three-day period may be displayed. In another display setting, sensed traffic levels in each lane of the intersection over a three-day period may be displayed. In yet another display setting, sensed traffic levels in each lane of the intersection at each hour of a single day may be displayed. In embodiments in which time periods or hierarchal levels associated with the sensors may be displayed, the sensor data may be stored as follows: Data {sequenceNo, startTime, x, y, hl, . . . , hl, measurements}, wherein "sequenceNo" gives an order of time intervals, "startTime" is a starting timestamp of an interval (an ending timestamp of the interval may inherently be the starting timestamp of the next interval), x and y are two-dimensional coordinates on a map, hl, . . . , hl record values of different hierarchal levels, and "measurement" gives a value of interest corresponding to the time interval.

It is noted that throughout the specification, an example of sensors that detect traffic information is provided for purposes of description. However, embodiments of the invention encompass any generation of spatiotemporal sensor data on a geographical display, and not merely generating such a display to show traffic data. Other examples of data which may be subject to such processing and display include data in electrical power system, systems monitoring the flow of water, air or other fluids, light detection systems, large-scale public utility systems, small-scale vehicle or building systems including environmental monitoring, information technology systems, including monitoring of the flow of data among computers, servers and other devices in a network, object-tracking systems or any other type of system relying on sensor data over a period of time in a geographic location.

Referring to FIG. 1, the map generator 114 generates a map or other geographic display of an area. The map may display or represent actual geography corresponding to locations on the earth. Alternatively, the map may represent virtual locations or nodes, such as in a data tracking system. For example, while a data monitoring system monitors physical devices, such as servers, at physical locations, a map that represents the server in relation to other devices may not correspond to actual geography, but may instead correspond to data pathways that do not necessarily correspond to physical distances between the physical devices. The lines or shapes representing data pathways or devices may be modified to account for a type of data connection, power transmission connection, or other path, being represented. In each case, a map, which may be a two-dimensional or a three-dimensional map, is generated to illustrate the physical locations, or devices, being monitored by sensors S.

An icon generator 115 is configured to generate an icon or other display object representing the sensor data. The map from the map generator 114 and the icon from the icon generator 115 are provided to the display generator 116 which generates display data to display the map 127 and icon 121 together on the display device 120. In particular, the icon 121 is generated at a location L1 on the map 127 corresponding to a physical location of a corresponding sensor in real life, or in an actual physical location that the map represents.

The icon 121 may be any type of icon or representation of sensor data representing both measurements of the sensor (e.g. magnitude or quantity of sensor input/output) and a duration of time over which the represented data was measured. In one embodiment, the icon is a series of concentric rings having diameters, colors or shading representing measurements of the sensor, the diameter of the outer-most ring representing a total duration over which the displayed measurements were measured, and the thicknesses of each of the rings representing sub-durations or blocks of time of equal length.

Figure 2:
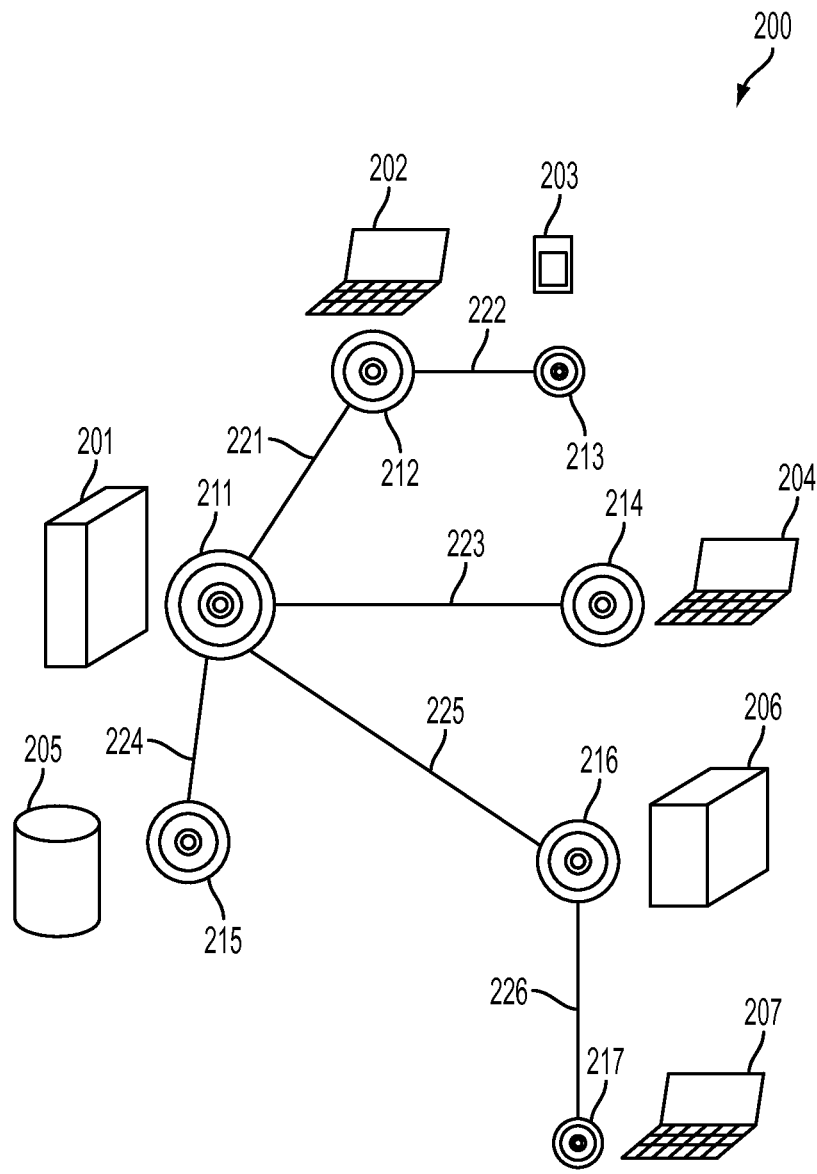
FIG. 2 illustrates a map according to one embodiment of the invention.

As discussed above, although the present disclosure describes physical street traffic for purposes of describing one embodiment, the present invention corresponds to any system in which a display is generated to represent locations of physical sensors or monitoring devices, measurements of the sensors and a time period over which the sensor data is measured. FIG. 2 illustrates an example of a map 200 according to another embodiment of the invention. The map 200 is a data traffic map 200, such that the devices and interconnections of the map may not correspond to actual physical locations or distances of the respective devices and interconnections. The map 200 may represent interconnections of multiple data transmission and storage devices including servers 201 and 206, personal computing devices 202, 204 and 207, handheld computing devices 203 and databases 205. The devices illustrated in FIG. 2 are provided only by way of example, and embodiments of the invention are not limited to the illustrated devices.

Icons 211-217 may be generated and associated with each device 201-207 in the system to represent data traffic through to and from the device and a time period over which the data traffic is measured. Interconnections 221-226 are illustrated to illustrate data lines, such as wired or wireless connections, including cable, universal serial bus, Ethernet and other connections. The lengths of the interconnections 221-226 may correspond to actual physical lengths, to data transmission speeds of the interconnections 221-226, to data capacities of the interconnections 221-226 or may be provided only as visual demonstrations of data connections without any relation to actual locations or characteristics of the interconnections 221-226.

Figure 3:
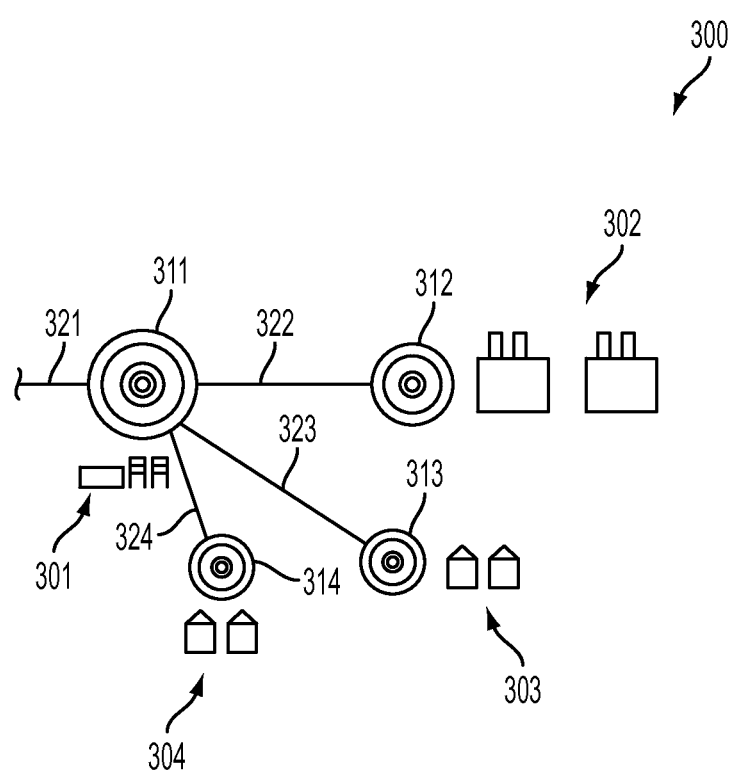
FIG. 3 illustrates a geographic display according to an embodiment of the invention.

FIG. 3 illustrates a geographic display 300, also referred to as a map 300, according to another embodiment. In FIG. 3, the map 300 illustrates a power distribution system. The power distribution system includes a power sub-station 301, industrial facilities 302 and residential areas 303 and 304. Icons 311-314 are associated with each of the power substation 301, industrial facilities 302 and residential areas 303 and 304 to illustrate a power flow to or through the facility or area and a time over which the displayed power flow is measured. Interconnectors 321-324 represent power lines. The locations of the power substation 301, industrial facilities 302 and residential areas 303 and 304 with respect to each other may correspond to actual physical locations or may be displayed only as a method of visualizing each of the locations 301-304 without any relation to actual geographic relationships.

While FIGS. 1-3 illustrate examples of traffic, data transmission, and power transmission sensors, embodiments of the present invention are not limited to the examples illustrated in these figures. Instead, embodiments of the invention encompass any system utilizing sensors to obtain data over a period of time, and capable of displaying the sensor data, location information, and time information together on a visual display.

Figure 4:
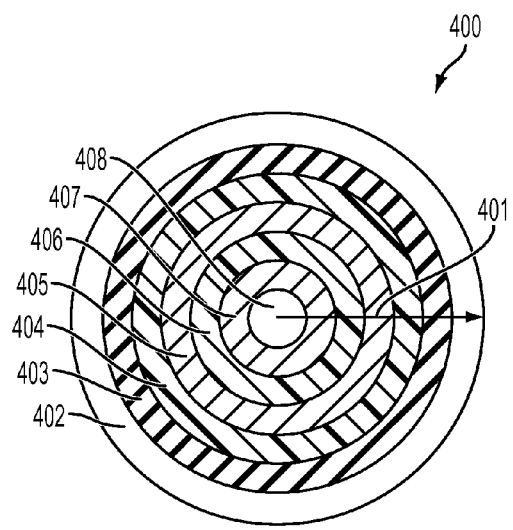
FIG. 4 illustrates an icon according to one embodiment.
Figure 5:
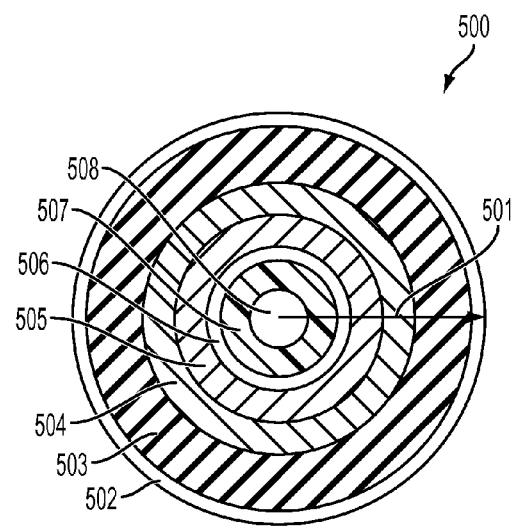
FIG. 5 illustrates an icon according to another embodiment.

FIGS. 4-7 illustrate examples of icons according to embodiments of the invention. Referring to FIG. 4, in which an icon 400 is illustrated as a series of concentric rings, a radius 401 or diameter of the outermost ring may correspond to a length of a duration of time over which the displayed measurements of a sensor were taken. Each ring 402-408 may correspond to an equal segment of time. For example, if the total displayed duration is seventy hours, then each ring 402-408 may correspond to a length of time of ten hours. The rings 402-408 may be color-coded, shaded, or otherwise distinguished from each other according to a magnitude of sensor measurements during the respective period of time. In FIGS. 4 and 5, different cross-hatching patterns represent different colors, shades or other distinguishing marks. For example, the center circle 408 is white, representing a low sensor output during the first ten hours. The second circle 407 may be shaded gray, representing an increased sensor output in the eleventh to twentieth hours, relative to the first ten hours. The third circle 406 may be shaded a darker gray, representing a further increase in sensor output in the twenty-first to thirtieth hours relative to the first and second rings 408 and 407. Accordingly, a user may view the icon 400 on a map and readily understand a level of sensor output over time.

In FIG. 4, the diameters of the rings 402 to 408 vary by a constant amount. For example, if one ring has a diameter of 1 centimeter (cm), the next ring has a diameter of 1.2 cm, the next ring has a diameter of 1.4 cm, etc. However, in some embodiments, the diameters of the rings may vary according to sensor output during the respective time period. For example, FIG. 5 illustrates an icon 500 made up of concentric rings 502-508, the outer-most ring having a radius 501 corresponding to the length of duration of time over which the measurements displayed by the icon 500 were measured. Similar to the icon of FIG. 4, each ring 502 to 508 corresponds to an equal duration of time, for example, ten hours. However, unlike the icon of FIG. 4, the rings 502 to 508 have varying widths according to sensor output in the respective durations of time. For example, the ring 507 has both an increased width and a cross-hatch pattern corresponding to a gray shading to represent high sensor output during the eleventh to twentieth hours. The ring 506 has no shading and a narrow diameter to represent low sensor output during the twenty-first to thirtieth hours. A radius of the outermost ring 502 represents both a total duration of time passed and an aggregate of sensor measurements during the total duration of time. The width of the outermost ring 502 represents only the measurements during the segment of time represented by the outermost ring 502. Accordingly, in FIG. 5 the sensor output may be illustrated in two aspects of the icon 500, both shading and ring width.

Figure 6:
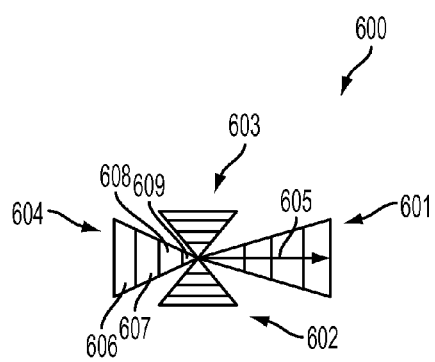
FIG. 6 illustrates an icon according to another embodiment.

FIG. 6 illustrates an icon 600 according to another embodiment of the invention. The icon of FIG. 6 represents sensor data of a lower hierarchal level than FIGS. 4 and 5. In particular, FIG. 6 illustrates an icon 600 having four segments 601 to 604, each segment representing a particular category or class of sensor data. For example, in an embodiment in which the icon 600 represents vehicular traffic, each segment 601 to 604 may represent a different direction of traffic, while the icons 400 and 500 of FIGS. 4 and 5 illustrate only total volume of traffic. Alternatively, in an embodiment in which the icon 600 represents data flow, segments 601 to 604 may represent different types of data, such as video data input, video data output, audio data input, audio data output, or data input or output from particular sources. In another alternative embodiment in which the icon 600 represents power consumed, each segment 601 to 604 may represent a different type of power-consuming device or different usage. In FIG. 6, the length 605 of the segments 601 to 604 may correspond to a level of sensor output over the duration represented by the icon. However, in an alternative embodiment, each of the segments of the icon may be displayed as having a same length, and only a shading or coloration of the separate sub-segments 606 to 609 may indicate a level of sensor output.

Figure 7:
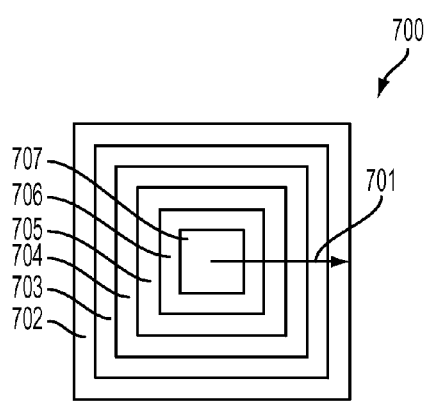
FIG. 7 illustrates an icon according to another embodiment.

FIG. 7 illustrates an icon 700 according to yet another embodiment. The icon 700 illustrated in FIG. 7 is a square shape, having a half-width 701 corresponding to a duration over which the sensor measurements displayed by the icon 700 are measured. The icon 700 is made up of segments 702 to 707 representing equal increments of time and may be shaded, colored or otherwise marked or labeled to indicate sensor output during the respective increments of time.

Although a few examples of icons have been illustrated in FIGS. 4-7, embodiments of the invention encompass icons of any shape, capable representing both a sensor output and a time duration over which measurements represented by the icon are taken. Other example shapes include polygons, segments of polygons, and arrows.

In embodiments of the present invention, sensor data is associated with a hierarchal level. In other words, multiple sensors may be grouped together and their outputs may be combined, such as by averaging or by any other algorithm, to form an upper hierarchal level. Sub-groups of the sensors may be combined to form an intermediate hierarchal level, and individual sensors may form a bottom-most hierarchal level. In such an example, the upper hierarchal level provides the least specific sensor output data, the intermediate hierarchal level provides a more specific sensor output data, and the bottom-most hierarchal level provides the most specific sensor output data.

Referring to the example of vehicle traffic, separate lanes may have individual sensors forming the lowest hierarchal level. When the icon is displayed to display the lowest hierarchal level, a user can see data corresponding to individual lanes of traffic. The sensor data from individual lanes may be grouped to form an intermediate hierarchal level corresponding to multiple lanes that are associated with traffic flowing in the same direction. When the icon displays the intermediate hierarchal level, a user cannot determine individual lane traffic, but the user can see traffic patterns at a direction level. The sensor data from the directions of traffic may be grouped to form the highest hierarchal level corresponding to an intersection. When the icon displays the highest hierarchal level, a user cannot see individual lane traffic or traffic flow in any direction, but the user can see a total volume of traffic through the intersection.

Similarly, in an example in which the icon represents data flow, the lowest hierarchal level may correspond to separate types of data input to a node and separate types of data output from the node. An intermediate level may correspond to data input into the node and data output from the node. In the intermediate level, a user may not be able to determine the specific types of data input or output from the node, but the user may be able to distinguish between traffic into and output from the node. At a highest hierarchal level, a user may not be able to distinguish between data input to or output from the node, but the user may only be able to see the total volume of data passing through the node.

In yet another example in which the icon represents power, the lowest hierarchal level may correspond to separate types of devices at a location that consume power. An intermediate level may correspond to separate classes of devices, such as high-power and low-power devices, but the user may not be able to see data regarding particular devices. At a highest hierarchal level, a user may not be able to distinguish between types of devices, but the user may only be able to see the total volume of power consumed at the location.

Figure 8A:
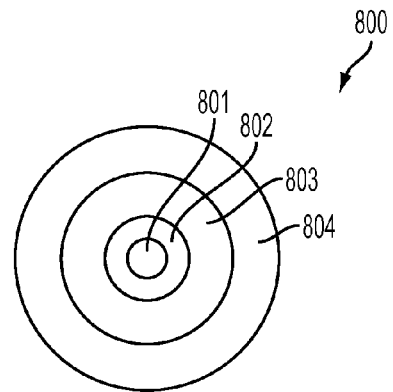
FIG. 8A illustrates an icon at a first hierarchy level according to one embodiment.
Figure 8B:
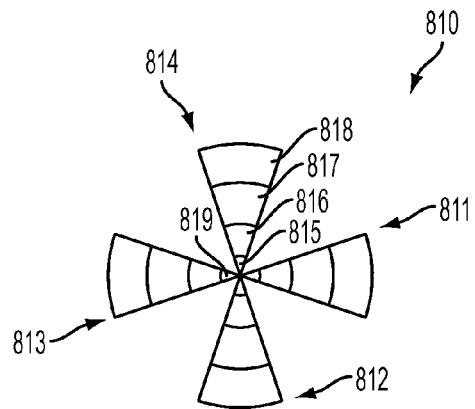
FIG. 8B illustrates an icon at a second hierarchy level.
Figure 8C:
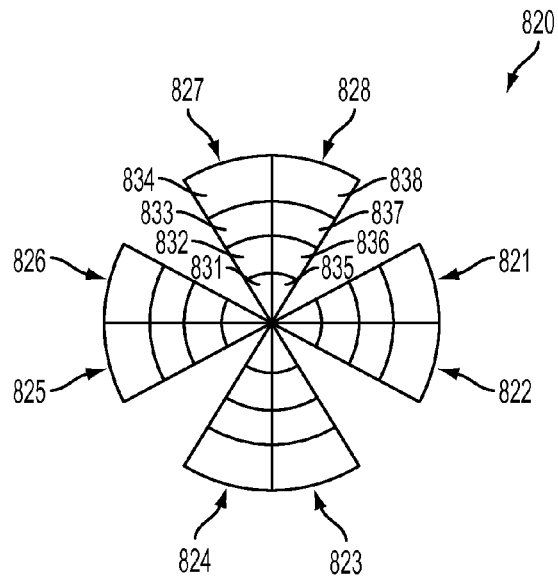
FIG. 8C illustrates an icon at a third hierarchy level.

In embodiments of the invention, an icon may be altered, changed, or replaced to illustrate different levels of sensor detail corresponding to different hierarchal levels when a map or geographic display is zoomed-in or zoomed-out. FIGS. 8A to 8C illustrate examples of an altered or replaced icon representing sensor data at different hierarchal levels according to embodiments of the invention. FIG. 8A illustrates a highest or top hierarchal icon 800 including rings 801 to 804 representing equal increments of time that together make up a time duration of sensor measurements represented by the icon 800. The rings 801 to 804 may be shaded, colored or otherwise marked to represent a level of sensor output during the time duration represented by the respective rings 801 to 804.

The sensor measurements of the icon 800 correspond to total sensor measurements, and a user may not be able to distinguish sub-categories of sensor measurements, such as direction, type of measurement, etc. In an example in which the icon 800 represents vehicular traffic, the rings 801 to 804 may be colored or shaded to represent a volume of traffic during the respective time period represented by the respective rings 801 to 804, although a user may not be able to determine direction of traffic, lanes of traffic or types of vehicles based on the icon 800.

FIG. 8B illustrates an intermediate hierarchal level icon 810. The icon 810 includes four segments 811, 812, 813 and 814. The four segments 811 to 814 provide additional detail regarding the sensors relative to the icon 800. The sub-segments 815 to 818 of each segment 811 to 814 may be shaded, colored or otherwise marked to represent a level of sensor output during the time duration represented by the respective sub-segments 815 to 818. The sub-segments of each segment 811 to 814 may correspond to a same time period according to the location of the sub-segment. For example, each of the sub-segments 815 and 818 may correspond to a first fifteen minute interval in an hour-long duration represented by the icon 810. Each of the sub-segments 815 and 818 may be colored or shaded differently to correspond to different levels of sensor output for the respective segments 813 and 814.

In the example in which the icon 810 represents vehicular traffic, the segments 811 to 814 may each correspond to traffic moving in a particular direction into an intersection. The sub-segment 815 may have a dark shading to represent a high traffic volume in a northerly direction during the first fifteen-minute interval, and the sub-segment 818 may have a light shading to represent a low traffic volume in a westerly direction during the first fifteen minute interval. Accordingly, while the icon 800 provides only information regarding volume of traffic through an intersection over time, the icon 810 provides information regarding traffic volume in particular directions through the intersection over time.

FIG. 8C illustrates a lower hierarchal level icon 820 according to one embodiment. The icon 820 includes eight segments 821 to 828, each representing volume through a different lane of the intersection. For example, segments 827 and 828 may correspond to two adjacent lanes having traffic that flows in the same direction. The segments 827 and 828 may have sub-segments 831-834 and 835-838, respectively, that are shaded, colored or otherwise marked independently of each other to indicate a volume of traffic through the respectively lanes during the respective time periods represented by the sub-segments 831-834 and 835-838.

Figure 9:
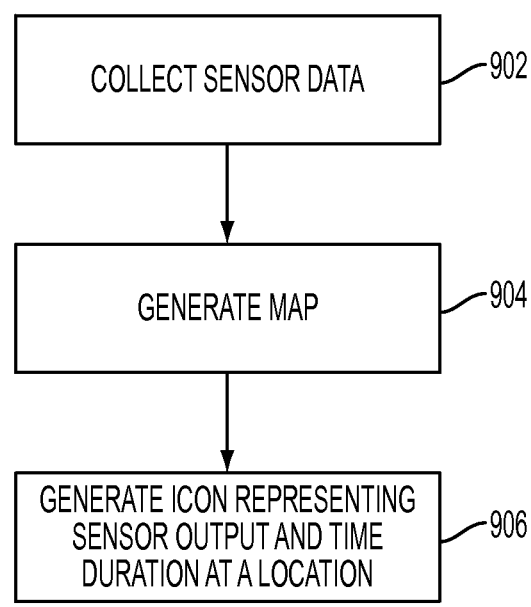
FIG. 9 is a flowchart illustrating a process for generating spatiotemporal visualization according to an embodiment of the invention.

FIG. 9 illustrates a method of visualizing spatial and temporal aspects of sensor data according to one embodiment of the invention. In block 902, sensor data is collected from multiple sensors or from a single sensor capable of generating multiple types of data. The sensor data may correspond to any type of sensor and any type of corresponding data.

In block 904, a map is generated. The sensor is associated in a map generating device with a location on the map. The map may be a geographic map, or a map which reflects physical distances between objects in the real world, typically on a smaller scale. Alternatively, the map may be a virtual map that displays in two-dimensional or three-dimensional space relationships among multiple elements, where the spatial relationships do not correspond to actual distances between the elements in the real world.

In block 906, an icon is generated on the map. The icon represents both a sensor output and a time duration. In other words, the sensor measurements are taken over time, and the icon represents both the predetermined period of time and the sensor measurements taken over the predetermined period of time. In one embodiment, the predetermined period of time is divided into segments of time, and each segment is colored, shaded, or otherwise marked to indicate a sensor output level during the period of time corresponding to the respective segment. In one embodiment, the icon is generated to illustrate a hierarchal level of sensor data, which has been discussed previously in this disclosure.

Figure 10:
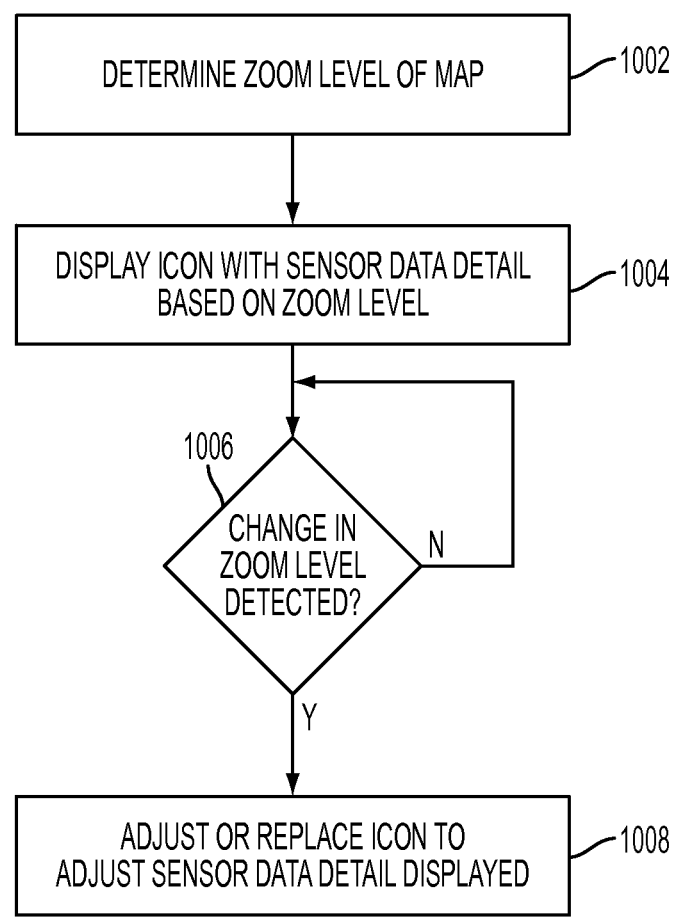
FIG. 10 is a flowchart illustrating a process for adjusting hierarchal sensor data according to a zoom level of a map according to one embodiment.

FIG. 10 illustrates a method of changing a hierarchal level of sensor data according to an embodiment of the invention. In block 1002, a zoom level of a map is determined. In block 1004, the icon is displayed to show sensor detail corresponding to the determined zoom level. If a zoom level is high, then the icon displays a low hierarchal level corresponding to a high degree of sensor data detail. On the other hand, if the zoom level is low, then the icon is displayed with a high hierarchal level corresponding to a low degree of sensor data detail.

In block 1006, a change in the zoom level is detected. In block 1008, if the change in zoom level is detected, the icon is adjusted or replaced to adjust sensor data detail displayed, or to change a hierarchal level displayed by the icon. For example, referring to FIGS. 8A to 8C, an initial zoom level may be determined in block 1002, and the initial zoom level may be an intermediate level so that the icon 810 having the intermediate level of sensor data detail is displayed. If it is determined in block 1006 that the map is zoomed out, the icon may be changed to icon 800 of FIG. 8A having a decreased level of sensor data detail displayed. Alternatively, if it is determined in block 1006 that the map is zoomed in, the icon may be changed to the icon 820 having an increased level of sensor data detail.

Figure 11:
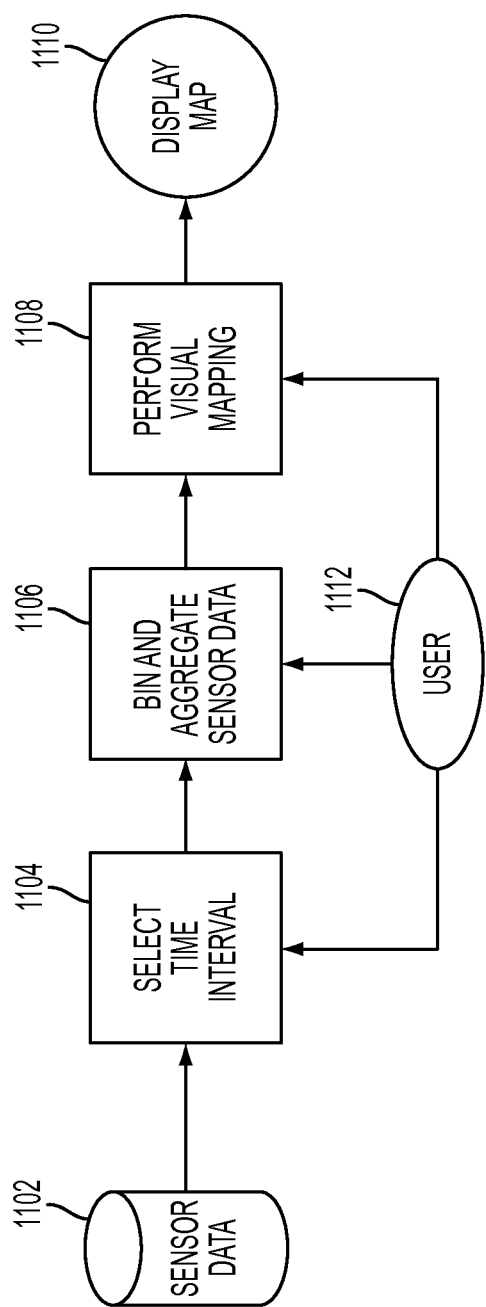
FIG. 11 is a block diagram illustrating a process for displaying spatiotemporal sensor data according to an embodiment of the invention.

FIG. 11 is a block diagram illustrating elements of generating a spatiotemporal display of sensor data according to one embodiment of the invention. Sensor data is stored at block 1102. The sensor data may be stored according to output level and time. For example, when graphed, the sensor data may be represented on a graph having time as an x axis and sensor output as a y axis.

In block 1104, a desired time interval is selected. For example, one or both of a total time duration to be displayed and time increments within the total time duration may be selected. The selection may be made by a user 1112 or may be pre-programmed in a display generating device by a manufacturer, by initialization software, or by any other device, network, or system. In one embodiment, the time interval selected for display may not correspond to a time interval at which the sensor collects data. For example, the sensor may collect data every second, while a selected duration to be displayed may be one day, and a selected time interval within the total time to be displayed may be one hour.

In block 1106, the sensor data is binned and aggregated based on the selected time interval. For example, when the sensor collects data every second and the selected time interval is one hour, the sensor data is binned in increments of one hour and the sensor data within each respective hour is aggregated according to a predetermined algorithm, such as averaging, generating a sum of all sensor data, or any other method. In one embodiment, the user 1112 may select the method of aggregating the sensor data within the bins. In other embodiments, the method of aggregating sensor data is determined based on a default setting, based on pre-existing software or hardware, based on inputs from another device or system, or by any other method.

In block 1108, visual mapping is performed, where the bins are mapped onto an icon of a size and shape that may be predetermined or may be selected by the user 1112. The bins may be used to generate an icon, where segments of the icon correspond to the bins. For example, with reference to FIGS. 4 and 5, the rings 402 to 408 of FIG. 4 may each correspond to a separate bin. Similarly, the rings 502 to 508 of FIG. 5 may each correspond to a separate bin. As illustrated in FIGS. 4 and 5, the segments of the icon generated icon corresponding to the bins may have a same thickness (FIG. 4) or may have a thickness that varies according to sensor data levels (FIG. 5). However, in each case, the segments 402 to 408 and 502 to 508 each correspond to a same time period, or a same bin.

In one embodiment, the sequential bin values are mapped onto a sequence of polygonal shapes of a same type having a same center, such as a series of concentric circles, concentric squares, etc. In other embodiment, the sequential bin values are mapped onto shapes that extend from a same center, a same axis or any other shared geometric feature, such as triangles or arcs extending from a same origin, rectangles or arrows extending from a same axis or from sides of a same circle or square, or any other geometric features.

A width, length, diameter or radius of the polygonal shape may correspond to a duration of an entire period of time for which sensor data is to be displayed, and the polygonal shape may be divided into a number of segments corresponding to the number of bins. In an embodiment in which each segment has a same length, width, diameter or radius representing a duration of the segment, the length, width, diameter or radius of each segment has a value corresponding to the length, width, diameter or radius of the entire polygonal shape divided by the number of segments.

Each segment is then shaded, colored or otherwise marked to represent a level of aggregated sensor data corresponding to the segment. In block 1110 the icon is generated on a map at a location corresponding to the sensor or group of sensors represented by the icon.

In one embodiment, the map is displayed and sensor data is displayed on the map in the form of icons having a predetermined size, representing a predetermined duration of time and having a predetermined number of segments making up the predetermined duration of time and representing by a corresponding number of segments in the icon. In one embodiment, different icons on the map have different sizes corresponding to different aggregated measurements over the predetermined period of time. In other words, the outer diameter of the icons may be the same based on a period of time over which measurements are taken or the outer diameter may vary according to the aggregated measurements over the predetermined period of time. The map may be a digitally-generated map having a user interface to allow a user to change settings of the map and the icon and view the changes on a visual display. The user interface may include, for example, a slider or other selection tool. When the user adjusts a value corresponding to a segment interval, the total number of segments may change, and a size of the bins for aggregating the sensor data may change. When the user adjusts a value corresponding to a total duration of the icon, the temporal resolution of the icon, or a duration of time represented by the icon, may change. When the user adjusts a value corresponding to a size of the icon, the size of the icon may change.

In addition, the sensor data 1102 may include groups of sensor data, as discussed previously with respect to FIGS. 8A to 8C. Accordingly, groups of sensors or different types or classes of sensor data at a particular location may be formed and aggregated by the sensor data aggregator in block 1106. In one embodiment, the user interface on the map may include a zoom button or other device or method for zooming in or zooming out. When the user zooms in or out with the zoom button, the icon may be adjusted in the manner illustrated in FIGS. 8A to 8C to include a same number of segments corresponding to time intervals, but to include different shapes or other methods of displaying different types of sensor data.

Figure 12:
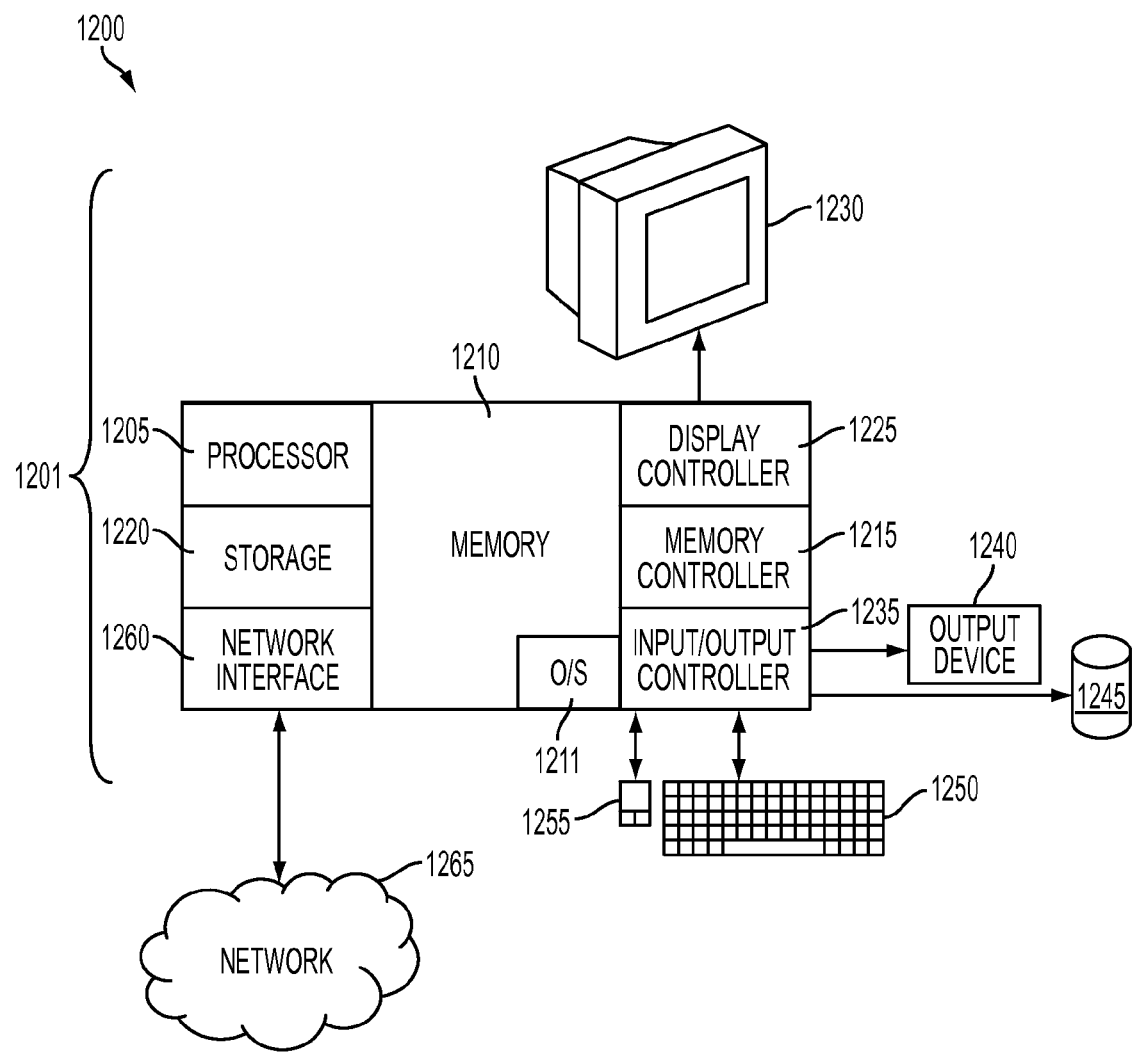
FIG. 12 illustrates a computer system according to one embodiment of the invention.

FIG. 12 illustrates a block diagram of a computer system 1200 according to an embodiment of the present invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 1200 therefore may include general-purpose computer or mainframe 1201.

In an exemplary embodiment, in terms of hardware architecture, as shown in FIG. 12, the computer 1201 includes a one or more processors 1205, memory 1210 coupled to a memory controller 1215, and one or more input and/or output (I/O) devices 1240, 1245 (or peripherals) that are communicatively coupled via a local input/output controller 1235. The input/output controller 1235 can be, for example, one or more buses or other wired or wireless connections, as is known in the art. The input/output controller 1235 may have additional elements, which are omitted for simplicity in description, such as controllers, buffers (caches), drivers, repeaters, and receivers, to enable communications. Further, the local interface may include address, control, and/or data connections to enable appropriate communications among the aforementioned components. The input/output controller 1235 may access the output devices 1240 and 1245.

The processor 1205 is a hardware device for executing software, particularly that stored in storage 1220, such as cache storage, or memory 1210. The processor 1205 can be any custom made or commercially available processor, a central processing unit (CPU), an auxiliary processor among several processors associated with the computer 1201, a semiconductor based microprocessor (in the form of a microchip or chip set), a macroprocessor, or generally any device for executing instructions.

The memory 1210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1210 may incorporate electronic, magnetic, optical, and/or other types of storage media. Note that the memory 1210 can have a distributed architecture, where various components are situated remote from one another, but can be accessed by the processor 1205.

The instructions in memory 1210 may include one or more separate programs, each of which comprises an ordered listing of executable instructions for implementing logical functions. In the example of FIG. 12, the instructions in the memory 1210 include a suitable operating system (O/S) 1211. The operating system 1211 essentially controls the execution of other computer programs and provides scheduling, input-output control, file and data management, memory management, and communication control and related services.

In an exemplary embodiment, a conventional keyboard 1250 and mouse 1255 can be coupled to the input/output controller 1235. Other output devices such as the I/O devices 1240, 1245 may include input devices, for example, but not limited to a printer, a scanner, microphone, and the like. Finally, the I/O devices 1240, 1245 may further include devices that communicate both inputs and outputs, for instance, but not limited to, a network interface card (NIC) or modulator/demodulator (for accessing other files, devices, systems, or a network), a radio frequency (RF) or other transceiver, a telephonic interface, a bridge, a router, and the like. The system 1200 can further include a display controller 1225 coupled to a display 1230. In an exemplary embodiment, the system 1200 can further include a network interface 1260 for coupling to a network 1265. The network 1265 can be any type of network, such as an IP-based network for communication between the computer 1201 and any external server, client and the like via a broadband connection, an optical fiber network, or any other type of network.

The network 1265 transmits and receives data between the computer 1201 and external systems. In an exemplary embodiment, network 1265 can be a managed IP network administered by a service provider. The network 1265 may be implemented in a wireless fashion, e.g., using wireless protocols and technologies, such as WiFi, WiMax, etc. The network 1265 can also be a packet-switched network such as a local area network, wide area network, metropolitan area network, Internet network, or other similar type of network environment. The network 1265 may be a fixed wireless network, a wireless local area network (LAN), a wireless wide area network (WAN) a personal area network (PAN), a virtual private network (VPN), intranet or other suitable network system and includes equipment for receiving and transmitting signals.

When the computer 1201 is in operation, the processor 1205 is configured to execute instructions stored within the memory 1210, to communicate data to and from the memory 1210, and to generally control operations of the computer 1201 pursuant to the instructions.

In an exemplary embodiment, the methods of managing memory described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In embodiments of the present disclosure, the methods of providing a spatiotemporal display of sensor data may utilize hardware and software within the computer system 1200, including memory 1210 or output devices 1240 and 1245 for storing sensor data, the processor 1205 for analyzing the sensor data, the display controller 1225 for generating an icon and map, the display 1230 for displaying the icon and map, and the keyboard 1250 and mouse 1255 for receiving user input regarding durations over which sensor data is to be displayed, durations of segments of sensor data and zoom levels of a map on which the icons representing the sensor data are displayed.

Figure 13:
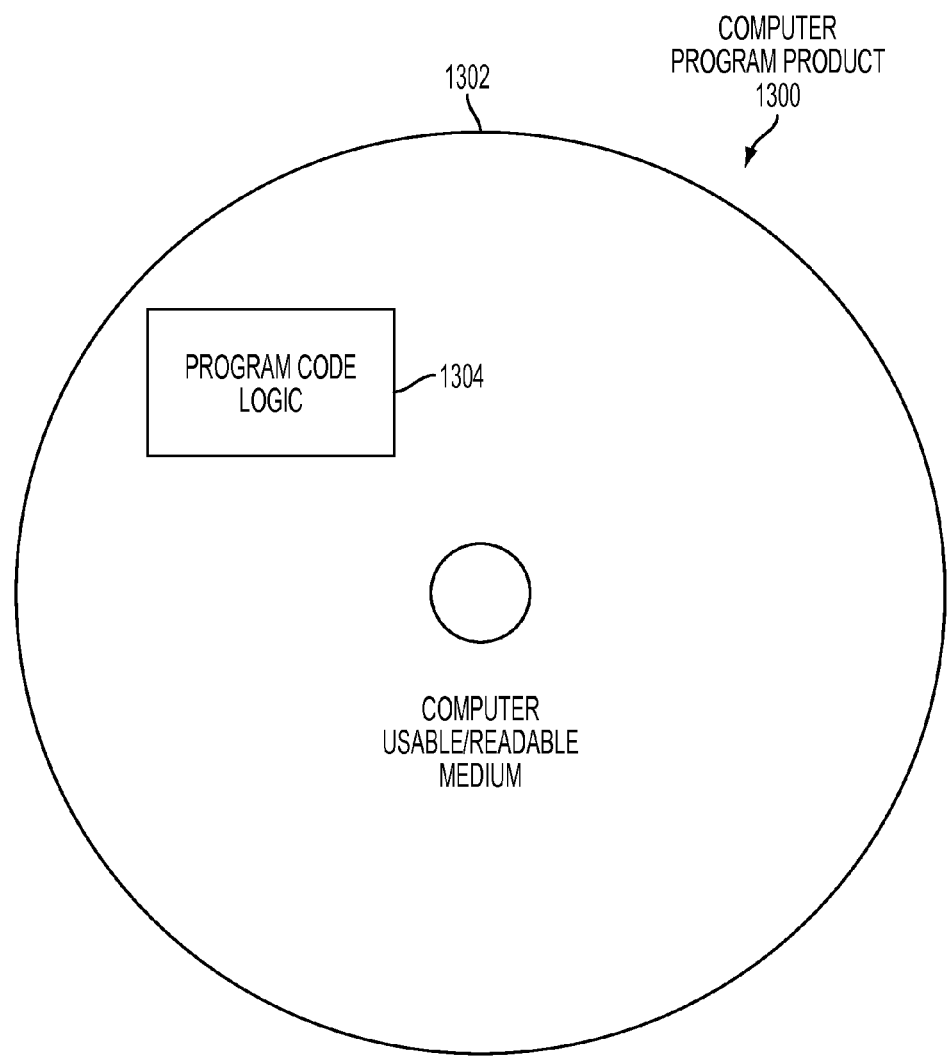
FIG. 13 illustrates a computer program product according to one embodiment of the invention.

As described above, embodiments can be embodied in the form of computer-implemented processes and apparatuses for practicing those processes. An embodiment may include a computer program product 1300 as depicted in FIG. 13 on a computer readable/usable medium 1302 with computer program code logic 1304 containing instructions embodied in tangible media as an article of manufacture. Exemplary articles of manufacture for computer readable/usable medium 1302 may include floppy diskettes, CD-ROMs, hard drives, universal serial bus (USB) flash drives, or any other computer-readable storage medium, wherein, when the computer program code logic 1304 is loaded into and executed by a computer, the computer becomes an apparatus for practicing the embodiments. Embodiments include computer program code logic 1304, for example, whether stored in a storage medium, loaded into and/or executed by a computer, or transmitted over some transmission medium, such as over electrical wiring or cabling, through fiber optics, or via electromagnetic radiation, wherein, when the computer program code logic 1304 is loaded into and executed by a computer, the computer becomes an apparatus for practicing the embodiments. When implemented on a general-purpose microprocessor, the computer program code logic 1304 segments configure the microprocessor to create specific logic circuits.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention to the particular embodiments described. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosed embodiments. Many modifications and variations will be apparent to those of ordinary skill in the art without departing from the scope and spirit of the embodiments of the present disclosure.

In embodiments of the present invention, sensor data gathered over a predetermined period of time is displayed at a location on a map. The displayed sensor data includes sensor output values, a visual indicator regarding a duration of time over which the sensor measurements are gathered, and visual indicators regarding sensor output values within segments of predetermined sizes within the total duration of time over which the sensor data is displayed. Accordingly, sensor data is displayed with a magnitude value, a temporal value and a spatial value. In addition, embodiments include representing sensor data at different hierarchal levels depending upon a zoom level of a map. Technical effects include providing an increased level of information to users that is easily accessible and understandable, and which may be easily and intuitively adjusted by the user. Embodiments of the invention are capable of scaling based on different time durations and different levels of sensor data hierarchies to represent more or less time and more or fewer levels of sensor data.

While preferred embodiments have been described above, it will be understood that those skilled in the art, both now and in the future, may make various improvements and enhancements which fall within the scope of the claims which follow.

What is claimed is:
1. A method for visualizing data, comprising:
   generating on a display device a map including a first location; and
   generating on the display device at least one icon graphically representing measurements of the sensor at the first location over a period of time and graphically representing the period of time;
   wherein the at least one icon is a polygonal shape including a first polygonal shape having a first size and a second polygonal shape having a second size smaller than the first size, the first and second polygonal shapes corresponding to different periods of time.

2. The method of claim 1, wherein the measurements are a hierarchal value capable of being displayed in a first degree of detail and a second degree of detail less than the first degree of detail, and the method further comprising:
   changing a hierarchal level of detail corresponding to the measurements based on changing a zoom-in level of the map.

3. The method of claim 1, wherein the second polygonal shape is located concentrically within the first polygonal shape.

4. The method of claim 1, wherein generating the at least one icon includes generating a polygonal shape having a size that corresponds to a length of the period of time.

5. The method of claim 1, wherein generating the at least one icon includes generating a polygonal shape having a size that corresponds to a magnitude of the measurement over the period of time.

6. The method of claim 1, wherein the measurements correspond to a level of traffic, and the measurements include a plurality of hierarchal levels including at least two of a lane level including information regarding a direction of traffic in the lane, a direction level including information regarding two or more adjacent lanes designated to permit traffic flow in a same direction, a road level including two or more direction levels in different directions, and an intersection level including two or more direction levels in different directions.

7. A method, comprising:
   gathering, by a sensor monitoring device, a plurality of measurements corresponding to a location of a map over a period of time;
   generating, by a display generating device, an icon at the location on the map corresponding to the plurality of measurements;
   wherein the icon is a polygonal shape including a first polygonal shape having a first size and a second polygonal shape having a second size smaller than the first size, the first and second polygonal shapes corresponding to different periods of time.

8. The method of claim 7, wherein the icon includes a directional facing and the sensor is associated with directional data, and
   generating the icon includes displaying the icon to have a directional facing corresponding to the directional data of the sensor.

9. The method of claim 7, wherein the plurality of measurements is a hierarchal value capable of being displayed in a first degree of detail and a second degree of detail less than the first degree of detail, and the method further comprising:
   determining a level of zoom of the map; and
   changing a hierarchal level of detail corresponding to the plurality of measurements based on determining the level of zoom.

10. The method of claim 7, wherein generating the icon comprises:
   generating cumulative measurement values for each of the plurality of measurements in the period of time;
   generating a separate icon for each one of the cumulative measurement values; and
   displaying the separate icons together in a predetermined pattern at the location on the map.

* * * * *